United States Patent
Okubo et al.

(10) Patent No.: US 11,537,945 B2
(45) Date of Patent: Dec. 27, 2022

(54) MACHINE LEARNING DEVICE AND MACHINE LEARNING METHOD

(71) Applicant: JTEKT CORPORATION, Osaka (JP)

(72) Inventors: Yusuke Okubo, Kariya (JP); Masaharu Hasuike, Kariya (JP)

(73) Assignee: JTEKT CORPORATION, Kariya (JP)

( * ) Notice: Subject to any disclaimer, the term of this patent is extended or adjusted under 35 U.S.C. 154(b) by 510 days.

(21) Appl. No.: 16/808,565

(22) Filed: Mar. 4, 2020

(65) Prior Publication Data

US 2020/0285998 A1 Sep. 10, 2020

(30) Foreign Application Priority Data

Mar. 7, 2019 (JP) .............................. JP2019-041742

(51) Int. Cl.
*G06N 20/00* (2019.01)
*G06N 5/04* (2006.01)
*G05B 13/00* (2006.01)
*G05B 13/02* (2006.01)
*G05B 13/04* (2006.01)

(52) U.S. Cl.
CPC ............. *G06N 20/00* (2019.01); *G05B 13/00* (2013.01); *G05B 13/0265* (2013.01); *G05B 13/04* (2013.01); *G06N 5/04* (2013.01)

(58) Field of Classification Search
CPC .......... G06N 20/00; G06N 5/04; G06N 5/045; G05B 13/00; G05B 13/0265; G05B 13/04; B29C 45/76; B29C 2945/76949; B29C 2945/76973
See application file for complete search history.

(56) References Cited

U.S. PATENT DOCUMENTS

2017/0243122 A1 8/2017 Komatsu et al.

FOREIGN PATENT DOCUMENTS

JP 2017-151962 A 8/2017

*Primary Examiner* — Tejal Gami
(74) *Attorney, Agent, or Firm* — Oblon, McClelland, Maier & Neustadt, L.L.P.

(57) ABSTRACT

A machine learning device includes a sparse modeling processing unit and a selection unit. The sparse modeling processing unit acquires individual importance degrees for each of explanatory variable candidates, the individual importance degrees being acquired by using respective sparse modeling methods different from each other, each of the sparse modeling methods taking input data including a specified objective variable in a learning model used for industrial activity and the explanatory variable candidates that are candidates for an explanatory variable for explaining the specified objective variable. The selection unit calculates a comprehensive importance degree for each of the explanatory variable candidates based on the individual importance degrees of each of the explanatory variable candidates, and selects an explanatory variable of the learning model from among the explanatory variable candidates based on the comprehensive importance degree.

17 Claims, 10 Drawing Sheets

| SCORE | FIRST EXTRACTION UNIT | CONTRIBUTION DEGREE | SECOND EXTRACTION UNIT | CONTRIBUTION DEGREE | THIRD EXTRACTION UNIT | CONTRIBUTION DEGREE | FOURTH EXTRACTION UNIT | CONTRIBUTION DEGREE |
|---|---|---|---|---|---|---|---|---|
| 10 | MOLD TEMPERATURE | 0.25 | MOLD TEMPERATURE | 0.22 | MOLD TEMPERATURE | 0.2 | MAINTAINING PRESSURE | 0.21 |
| 9 | MAINTAINING PRESSURE | 0.23 | MAINTAINING PRESSURE | 0.18 | MAINTAINING PRESSURE | 0.19 | MOLD TEMPERATURE | 0.17 |
| 8 | PRESSURE-MAINTAINING TIME | 0.19 | PRESSURE-MAINTAINING TIME | 0.15 | CYLINDER TEMPERATURE | 0.17 | CYLINDER TEMPERATURE | 0.15 |
| 7 | CYLINDER TEMPERATURE | 0.13 | CYLINDER TEMPERATURE | 0.14 | PRESSURE-MAINTAINING TIME | 0.13 | PRESSURE-MAINTAINING TIME | 0.14 |
| 6 | INJECTION SPEED | 0.07 | NOZZLE TEMPERATURE | 0.08 | INJECTION SPEED | 0.07 | V-P SWITCHING | 0.08 |
| 5 | V-P SWITCHING | 0.05 | INJECTION SPEED | 0.03 | NOZZLE TEMPERATURE | 0.07 | NOZZLE TEMPERATURE | 0.04 |
| 4 | NOZZLE TEMPERATURE | 0.03 | V-P SWITCHING | 0 | V-P SWITCHING | 0.05 | INJECTION SPEED | 0.03 |
| 3 | PRESSURE-MAINTAINING LIMIT SPEED | 0.03 | SCREW ROTATION SPEED | 0 | BACK PRESSURE | 0.03 | BACK PRESSURE | 0.01 |
| 2 | BACK PRESSURE | 0.02 | PRESSURE-MAINTAINING LIMIT SPEED | 0 | SCREW ROTATION SPEED | 0.01 | COOLING TIME | 0 |
| 1 | COOLING TIME | 0 | BACK PRESSURE | 0 | PRESSURE-MAINTAINING LIMIT SPEED | 0.01 | PRESSURE-MAINTAINING LIMIT SPEED | 0 |
| 0 | SCREW ROTATION SPEED | 0 | COOLING TIME | 0 | COOLING TIME | 0.01 | SCREW ROTATION SPEED | 0 |

FIG. 8

| RANKING | EXPLANATORY VARIABLE CANDIDATES | COMPREHENSIVE IMPORTANCE DEGREE |
|---|---|---|
| 1 | MOLD TEMPERATURE | 39 |
| 2 | MAINTAINING PRESSURE | 37 |
| 3 | PRESSURE-MAINTAINING TIME | 30 |
| 3 | CYLINDER TEMPERATURE | 30 |
| 5 | INJECTION SPEED | 21 |
| 6 | NOZZLE TEMPERATURE | 20 |
| 7 | V-P SWITCHING | 15 |
| 8 | BACK PRESSURE | 8 |
| 9 | PRESSURE-MAINTAINING LIMIT SPEED | 4 |
| 10 | SCREW ROTATION SPEED | 2 |
| 11 | COOLING TIME | 0 |

FIG. 9

| SCORE | FIRST EXTRACTION UNIT | CONTRIBUTION DEGREE | SECOND EXTRACTION UNIT | CONTRIBUTION DEGREE | THIRD EXTRACTION UNIT | CONTRIBUTION DEGREE | FOURTH EXTRACTION UNIT | CONTRIBUTION DEGREE |
|---|---|---|---|---|---|---|---|---|
| 10 | MOLD TEMPERATURE | 0.25 | MOLD TEMPERATURE | 0.22 | MOLD TEMPERATURE | 0.2 | MAINTAINING PRESSURE | 0.21 |
| 6 | MAINTAINING PRESSURE | 0.23 | MAINTAINING PRESSURE | 0.18 | MAINTAINING PRESSURE | 0.19 | MOLD TEMPERATURE | 0.17 |
| 4 | PRESSURE-MAINTAINING TIME | 0.19 | PRESSURE-MAINTAINING TIME | 0.15 | CYLINDER TEMPERATURE | 0.17 | CYLINDER TEMPERATURE | 0.15 |
| 2 | CYLINDER TEMPERATURE | 0.13 | CYLINDER TEMPERATURE | 0.14 | PRESSURE-MAINTAINING TIME | 0.13 | PRESSURE-MAINTAINING TIME | 0.14 |
| 1 | INJECTION SPEED | 0.07 | NOZZLE TEMPERATURE | 0.08 | INJECTION SPEED | 0.07 | V-P SWITCHING | 0.08 |
| 0 | V-P SWITCHING | 0.05 | INJECTION SPEED | 0.03 | NOZZLE TEMPERATURE | 0.07 | NOZZLE TEMPERATURE | 0.04 |
| 0 | NOZZLE TEMPERATURE | 0.03 | V-P SWITCHING | 0 | V-P SWITCHING | 0.05 | INJECTION SPEED | 0.03 |
| 0 | PRESSURE-MAINTAINING LIMIT SPEED | 0.03 | SCREW ROTATION SPEED | 0 | BACK PRESSURE | 0.03 | BACK PRESSURE | 0.01 |
| 0 | BACK PRESSURE | 0.02 | PRESSURE-MAINTAINING LIMIT SPEED | 0 | SCREW ROTATION SPEED | 0.01 | COOLING TIME | 0 |
| 0 | COOLING TIME | 0 | BACK PRESSURE | 0 | PRESSURE-MAINTAINING LIMIT SPEED | 0.01 | PRESSURE-MAINTAINING LIMIT SPEED | 0 |
| 0 | SCREW ROTATION SPEED | 0 | COOLING TIME | 0 | COOLING TIME | 0.01 | SCREW ROTATION SPEED | 0 |

FIG. 10

| RANKING | EXPLANATORY VARIABLE CANDIDATES | COMPREHENSIVE IMPORTANCE DEGREE |
|---|---|---|
| 1 | MOLD TEMPERATURE | 36 |
| 2 | MAINTAINING PRESSURE | 28 |
| 3 | PRESSURE-MAINTAINING TIME | 12 |
| 3 | CYLINDER TEMPERATURE | 12 |
| 5 | INJECTION SPEED | 2 |
| 6 | NOZZLE TEMPERATURE | 1 |
| 6 | V-P SWITCHING | 1 |
| - | BACK PRESSURE | 0 |
| - | PRESSURE-MAINTAINING LIMIT SPEED | 0 |
| - | SCREW ROTATION SPEED | 0 |
| - | COOLING TIME | 0 |

FIG. 11

| RANKING | FIRST EXTRACTION UNIT | CONTRIBUTION DEGREE | SECOND EXTRACTION UNIT | CONTRIBUTION DEGREE | THIRD EXTRACTION UNIT | CONTRIBUTION DEGREE | FOURTH EXTRACTION UNIT | CONTRIBUTION DEGREE |
|---|---|---|---|---|---|---|---|---|
| 1 | MOLD TEMPERATURE | 0.25 | MOLD TEMPERATURE | 0.22 | MOLD TEMPERATURE | 0.2 | MAINTAINING PRESSURE | 0.23 |
| 2 | MAINTAINING PRESSURE | 0.23 | MAINTAINING PRESSURE | 0.18 | MAINTAINING PRESSURE | 0.19 | MOLD TEMPERATURE | 0.19 |
| 3 | PRESSURE-MAINTAINING TIME | 0.19 | PRESSURE-MAINTAINING TIME | 0.15 | CYLINDER TEMPERATURE | 0.17 | CYLINDER TEMPERATURE | 0.17 |
| 4 | CYLINDER TEMPERATURE | 0.13 | CYLINDER TEMPERATURE | 0.14 | PRESSURE-MAINTAINING TIME | 0.13 | PRESSURE-MAINTAINING TIME | 0.15 |
| 5 | INJECTION SPEED | 0.07 | NOZZLE TEMPERATURE | 0.08 | INJECTION SPEED | 0.07 | V-P SWITCHING | 0.08 |
| 6 | V-P SWITCHING | 0.05 | INJECTION SPEED | 0.03 | NOZZLE TEMPERATURE | 0.07 | NOZZLE TEMPERATURE | 0.04 |
| 7 | NOZZLE TEMPERATURE | 0.03 | V-P SWITCHING | 0 | V-P SWITCHING | 0.05 | INJECTION SPEED | 0.03 |
| 8 | PRESSURE-MAINTAINING LIMIT SPEED | 0.03 | SCREW ROTATION SPEED | 0 | BACK PRESSURE | 0.03 | BACK PRESSURE | 0.01 |
| 9 | BACK PRESSURE | 0.02 | PRESSURE-MAINTAINING LIMIT SPEED | 0 | SCREW ROTATION SPEED | 0.01 | COOLING TIME | 0 |
| 10 | COOLING TIME | 0 | BACK PRESSURE | 0 | PRESSURE-MAINTAINING LIMIT SPEED | 0.01 | PRESSURE-MAINTAINING LIMIT SPEED | 0 |
| 11 | SCREW ROTATION SPEED | 0 | COOLING TIME | 0 | COOLING TIME | 0.01 | SCREW ROTATION SPEED | 0 |
| | (×1) | | (×(10/8)) | | (×1) | | (×(10/9)) | |

FIG. 12

| RANKING | EXPLANATORY VARIABLE CANDIDATES | COMPREHENSIVE IMPORTANCE DEGREE |
|---|---|---|
| 1 | MOLD TEMPERATURE | 0.93 |
| 2 | MAINTAINING PRESSURE | 0.90 |
| 3 | PRESSURE-MAINTAINING TIME | 0.67 |
| 4 | CYLINDER TEMPERATURE | 0.65 |
| 5 | NOZZLE TEMPERATURE | 0.62 |
| 6 | INJECTION SPEED | 0.21 |
| 7 | V-P SWITCHING | 0.19 |
| 8 | BACK PRESSURE | 0.06 |
| 9 | PRESSURE-MAINTAINING LIMIT SPEED | 0.04 |
| 10 | SCREW ROTATION SPEED | 0.01 |
| 11 | COOLING TIME | 0 |

MACHINE LEARNING DEVICE AND MACHINE LEARNING METHOD

CROSS-REFERENCES TO RELATED APPLICATIONS

This application is based upon and claims the benefit of priority from Japanese Patent Application No. 2019-041742, filed on Mar. 7, 2019, the entire contents of which are incorporated herein by reference.

FIELD

One or more embodiments of the present invention relate to a machine learning device and a machine learning method.

BACKGROUND

JP-A-2017-151962 discloses a technique of predicting a state of a production facility or a state of a production object using machine learning. Further, in recent years, sparse modeling has been attracting attention as a method for selecting an explanatory variable used for explaining a specified objective variable in a learning model used in prediction of a machine learning device.

SUMMARY

As types of the sparse modeling method, lasso, stepwise, and the like are known. In this regard, when selecting an explanatory variable from among a plurality of explanatory variable candidates by using different sparse modeling methods, data that is selected as the explanatory variable in each sparse modeling method may not match with each other even if contents of input data, which are the explanatory variable candidates, are the same. That is, an explanatory variable selected using one sparse modeling method is not necessarily suitable as the explanatory variable, and an important explanatory variable included in the explanatory variable candidates used as input data may not be selected in the one sparse modeling method.

An object of one or more embodiments of the present invention is to provide a machine learning device and a machine learning method for reliably selecting a suitable explanatory variable from a plurality of explanatory variable candidates.

There is provided a machine learning device that includes: a sparse modeling processing unit that acquires a plurality of individual importance degrees for each of a plurality of explanatory variable candidates, the plurality of individual importance degrees being acquired by using respective sparse modeling methods different from each other, each of the sparse modeling methods taking input data including a specified objective variable in a learning model used for industrial activity and the plurality of explanatory variable candidates that are candidates for an explanatory variable for explaining the specified objective variable; and a selection unit that calculates a comprehensive importance degree for each of the plurality of explanatory variable candidates based on the plurality of the individual importance degrees of each of the plurality of explanatory variable candidates, and selects an explanatory variable of the learning model from among the plurality of explanatory variable candidates based on the comprehensive importance degree.

According to the machine learning device, the selection unit calculates the comprehensive importance degree for each of the plurality of explanatory variable candidates based on the plurality of individual importance degrees acquired by the sparse modeling processing unit, and selects a suitable variable candidate as the explanatory variable from among the plurality of explanatory variable candidates based on the comprehensive importance degree. Therefore, the machine learning device can reliably select a suitable explanatory variable.

There is provided a machine learning method that includes: acquiring a plurality of individual importance degrees for each of a plurality of explanatory variable candidates, the plurality of individual importance degrees being acquired by using respective sparse modeling methods different from each other, each of the sparse modeling methods taking input data comprising a specified objective variable in a learning model used for industrial activity and the plurality of explanatory variable candidates that are candidates for an explanatory variable for explaining the specified objective variable; and calculating a comprehensive importance degree for each of the plurality of explanatory variable candidates based on the plurality of the individual importance degrees of each of the plurality of explanatory variable candidates, and selecting an explanatory variable of the learning model from among the plurality of explanatory variable candidates based on the comprehensive importance degree. The machine learning method has the same or similar effects as those of the machine learning device described above.

BRIEF DESCRIPTION OF DRAWINGS

FIG. 7 is a table illustrating adjusted individual importance degrees calculated by an adjustment unit in an adjusting step of a first example.

FIG. 9 is a table illustrating adjusted individual importance degrees calculated by the adjustment unit in an adjusting step of a second example.

DETAILED DESCRIPTION (1. Overview of Machine Learning Device)

A machine learning device selects, from among a plurality of explanatory variable candidates, an explanatory variable for explaining a specified objective variable in a learning model used for industrial activity. At this time, the machine learning device selects the explanatory variable based on a comprehensive importance degree calculated for each of the explanatory variable candidates. The comprehensive importance degree is calculated based on an individual importance degree assigned to each of the explanatory variable candidates. The individual importance degree is a value obtained by performing processing in which a sparse modeling method is used.

The machine learning device calculates the comprehensive importance degree for each of the plurality of explanatory variable candidates, based on individual importance degrees obtained in processing using a plurality of sparse modeling methods different from each other. Further, the machine learning device selects a suitable explanatory variable candidate as the explanatory variable from among the plurality of explanatory variable candidates, based on the comprehensive importance degree. Accordingly, the machine learning device can reliably select a suitable explanatory variable from among a plurality of explanatory variable candidates. As a result, the machine learning device can generate a learning model by performing machine learning in which the selected explanatory variable and the objective variable are used as learning data. Further, when the machine learning device performs a predetermined prediction based on the explanatory variable and based on the learning model, accuracy of the prediction can be improved.

(2. Application Target of Machine Learning Device)

The machine learning device is provided in a processing device that performs predetermined processing, or in a management device that performs overall management on a plurality of processing devices. Further, the machine learning device performs a predetermined prediction based on an explanatory variable and based on a learning model. In the present embodiment, the processing device is a molding machine, and the management device performs overall management on a plurality of molding machines. Further, based on various types of data obtained from the molding machine, the machine learning device predicts abnormality detection of the molding machine, optimization of operation conditions of the molding machine, or a processing result (for example, a quality factor of a molded product) of the molding machine. As a processing device other than the molding machine, a machine tool such as a grinding machine is exemplified.

(3. Overview of Quality Prediction System 100)

Figure 1:
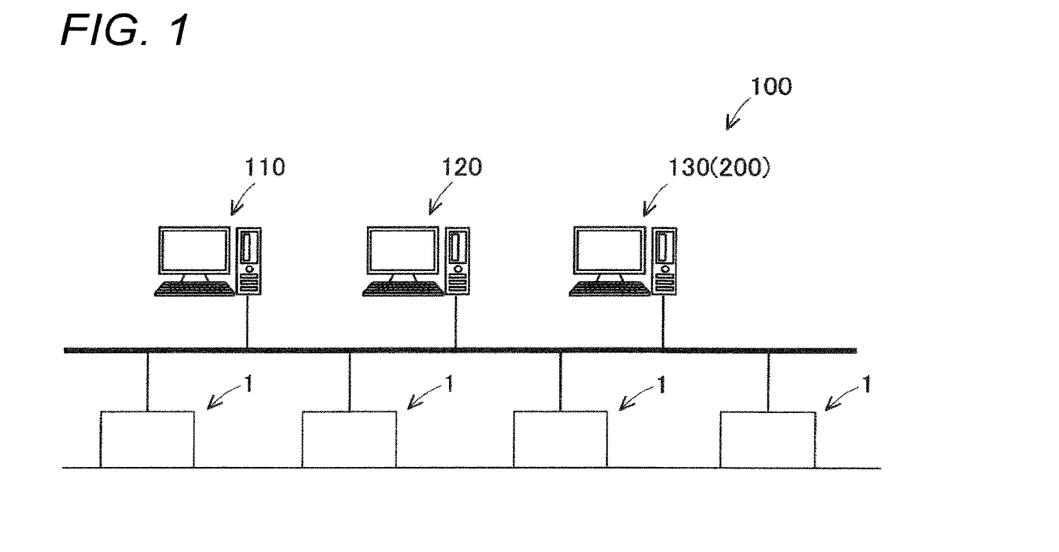
FIG. 1 is a diagram illustrating a configuration of a quality prediction system.

First, an overview of a quality prediction system 100, which is an example of an embodiment in which a machine learning device is embodied, will be described with reference to FIG. 1. As illustrated in FIG. 1, the quality prediction system 100 mainly includes a plurality of molding machines 1, an input unit 110, a server 120, and a management device 130.

The molding machine 1 produces a molded product by a molding process including supplying a material (hereinafter referred to as "molten material") that is molten by heating to a cavity C of a mold 4 of the molding machine 1. In the present embodiment, an injection molding machine is described as an example of the molding machine 1. The injection molding machine performs injection molding of resin, rubber or the like. Alternatively, the molding machine 1 may be a molding machine other than an injection molding machine, for example, a blow molding machine or a compression molding machine, or may be a casting machine that performs metal casting such as die casting.

The input unit 110 is configured to receive an input of data (hereinafter, referred to as "quality factor data") that relates to a quality factor of the molded product produced by the molding machine 1. In other words, the quality factor data is input into the input unit 110. An example of the quality factor of the molded product may include measurement results related to a dimension, a shape, and the like of the molded product, which are measured by various measurement devices provided outside the molding machine 1.

The server 120 is provided so as to be capable of communicating with the plurality of molding machines 1 and the input unit 110. The server 120 collects the quality factor data of the molded product input into the input unit 110, and molding process data that is obtained when the molded product is molded by the molding machine 1.

The management device 130 performs overall management on the plurality of molding machines 1 provided in the quality prediction system 100. Further, the management device 130 includes a machine learning device 200 that is provided so as to be capable of communicating with the molding machine 1 and the input unit 110 via the server 120. The machine learning device 200 acquires the quality factor data and the molding process data that is collected by the server 120. Further, the machine learning device 200 generates a learning model that is related to the molding process data and the quality factor of the molded product, by performing machine learning in which the molding process data and the quality factor data is used as learning data. In the present embodiment, a case in which the machine learning is supervised learning will be described as an example, and alternatively other machine learning algorithms may be applied.

Further, the machine learning device 200 takes the molding process data, which is obtained when the molded product is molded by the molding machine 1, as an explanatory variable of the learning model, and predicts a quality factor of the molded product based on the explanatory variable and the learning model.

In addition, the machine learning device 200 takes a plurality of pieces of molding process data, which can be obtained from the molding machine 1, as explanatory variable candidates, and selects a suitable explanatory variable from among the plurality of explanatory variable candidates. That is, the machine learning device 200 selects a predetermined number of pieces of molding process data, which has a high correlation with a quality factor of the molded product which is an objective variable, from among the molding process data serving as a large number of explanatory variables that can be obtained, and uses the selected predetermined number of pieces of molding process data as explanatory variables of the learning model.

Accordingly, for example, in optimizing operation conditions of the molding machine 1 based on a prediction result of the quality factor of the molded product, a user of the quality prediction system 100 can optimize operation conditions, which affect the molding process data used as the explanatory variables.

That is, the machine learning device 200 extracts molding process data that has a high correlation with a specified quality factor to be predicted of a molded product, and predicts the quality factor based on the extracted molding process data. Therefore, when optimizing the operation conditions for an objective of improving the quality factor of the molded product, the user may adjust the operation conditions such that the molding process data having a high correlation with the quality factor is good. As a result, the user of the machine learning device 200 can narrow down the operation conditions, which need to be adjusted to improve the specified quality factor of the molded product, from among a large number of operation conditions that can be adjusted, and thus time required for optimizing the operation conditions can be shortened.

(3. Example of Molding Machine 1)

(3-1: Configuration of Molding Machine 1)

Figure 2:
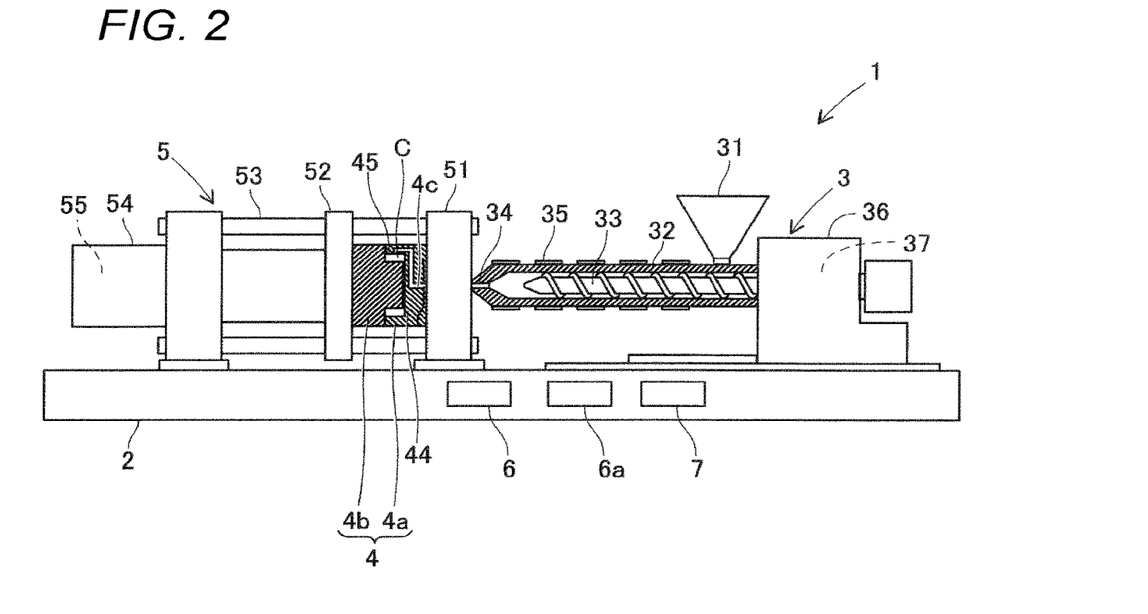
FIG. 2 is a diagram illustrating a molding machine (injection molding machine).

Next, an injection molding machine as an example of the molding machine 1 will be described with reference to FIG. 2. The molding machine 1 that is an injection molding machine mainly includes a bed 2, an injection device 3, the mold 4, a clamping device 5, an operation command unit 6, and a control unit 7.

The injection device 3 is disposed on the bed 2. The injection device 3 mainly includes a hopper 31, a heating cylinder 32, a screw 33, a nozzle 34, a heater 35, a drive device 36, and an injection device sensor 37.

The hopper 31 serves as a feeding port of pellets (a granular molding material). The heating cylinder 32 pressurizes a molten material obtained by heating and melting the pellets fed into the hopper 31. The heating cylinder 32 is provided so as to be movable in an axial direction with respect to the bed 2. The screw 33 is disposed inside the heating cylinder 32, and is provided so as to be movable in the axial direction and rotatable. The nozzle 34 is an injection port provided at a tip end of the heating cylinder 32, through which the molten material inside the heating cylinder 32 is supplied to the mold 4 by movement in the axial direction of the screw 33.

The heater 35 is provided, for example, on an outer side of the heating cylinder 32, and heats the pellets inside the heating cylinder 32. The drive device 36 moves the heating cylinder 32 in the axial direction, rotates the screw 33, and moves the screw 33 in the axial direction. The injection device sensor 37 generally refers to a sensor that acquires molding process data such as a storage amount of the molten material, a maintaining pressure, a pressure-maintaining time, an injection speed, a viscosity of the molten material, and a state of the drive device 36. However, the sensor 37 is not limited to the above, and may acquire various types of molding process data.

The mold 4 includes a first mold 4a that is a fixed part and a second mold 4b that is a movable part. By clamping the first mold 4a and the second mold 4b, the cavity C is defined in the mold 4 between the first mold 4a and the second mold 4b. The first mold 4a includes a supply path 4c (sprue, runner, gate) through which the molten material supplied from the nozzle 34 is guided to the cavity C. Further, the first mold 4a or the second mold 4b is provided with various types of sensors for acquiring a temperature and the like of the mold 4.

The clamping device 5 is disposed on the bed 2, facing the injection device 3. The clamping device 5 opens and closes the mounted mold 4, and prevents the mold 4 from being opened by a pressure of the molten material injected into the cavity C when the mold 4 is clamped.

The clamping device 5 includes a fixed platen 51, a movable platen 52, a tie bar 53, a drive device 54, and a clamping device sensor 55. The first die 4a is fixed to the fixed platen 51. The fixed platen 51 is contactable with the nozzle 34 of the injection device 3, and guides the molten material injected from the nozzle 34 to the mold 4. The second mold 4b is fixed to the movable platen 52. The movable platen 52 is capable of approaching and separating from the fixed platen 51. The tie bar 53 supports a movement of the movable platen 52. The drive device 54 is configured with, for example, a cylinder device, and moves the movable platen 52. The clamping device sensor 55 generally refers to a sensor that acquires molding process data such as a clamping force, a mold temperature, and a state of the drive device 54.

The operation command unit 6 provides operation command data related to molding conditions to the control unit 7. The molding machine 1 includes an operation command data adjustment unit 6a that adjusts operation command data stored in the operation command unit 6, based on a prediction result of the quality factor from the machine learning device 200. Since the operation command unit 6 provides the operation command data adjusted by the operation command data adjustment unit 6a to the control unit 7, the molding machine 1 can optimize the operation command data and improve the quality of the molded product to be molded.

The control unit 7 controls the drive device 36 of the injection device 3 and the drive device 54 of the clamping device 5, based on the operation command data from the operation command unit 6. For example, the control unit 7 acquires various types of information from the injection device sensor 37 and the clamping device sensor 55, and performs an operation according to the operation command data, thereby controlling the drive device 36 of the injection device 3 and the drive device 54 of the clamping device 5.

(3-2: Method of Molding Molded Product by Molding Machine 1)

Subsequently, a method of molding a molded product by the molding machine 1 that is an injection molding machine will be described. In the molding method to be performed by the molding machine 1, a measuring step, a clamping step, an injection filling step, a pressure maintaining step, a cooling step, and a releasing step are sequentially performed. In the measuring step, the molding machine 1 stores the molten material between the tip end of the heating cylinder 32 and the nozzle 34 while melting the pellets by heating of the heater 35 and by shear frictional heat generated accompanying the rotation of the screw 33. At this time, since the screw 33 retreats accompanying an increase in the storage amount of the molten material, the storage amount of the molten material is measured from a retreat position of the screw 33.

In the clamping step following the measuring step, the molding machine 1 moves the movable platen 52 to align the second mold 4b with the first mold 4a to perform clamping. Further, the molding machine 1 moves the heating cylinder 32 in the axial direction to bring the heating cylinder 32 close to the clamping device 5, and connects the nozzle 34 to the fixed platen 51 of the clamping device 5. In the following injection filling step, the molding machine 1 moves the screw 33 toward the nozzle 34 with a predetermined pushing force, with rotation of the screw 33 stopped, thereby injecting and filling the molten material into the mold 4 at a high pressure. When the cavity C is filled with the molten material, the molding machine 1 shifts to the pressure maintaining step.

In the pressure maintaining step, the molding machine 1 performs pressure maintaining processing, in which the molten material is further pushed into the cavity C, with the molten material filled in the cavity C, and a predetermined pressure (maintaining pressure) is applied to the molten material in the cavity C for a predetermined time. Specifically, the molding machine 1 applies a predetermined maintaining pressure to the molten material by applying a predetermined pushing force to the screw 33.

Further, the molding machine 1 performs the pressure maintaining processing for a predetermined time, and thereafter shifts to the cooling step. In the cooling step, the molding machine 1 cools the molten material in the cavity C while performing processing in which the maintaining pressure is reduced by stopping pushing the molten material. Finally, the molding machine 1 opens the mold in the releasing step and takes out the molded product.

(4. Configuration of Machine Learning Device 200)

Figure 3:
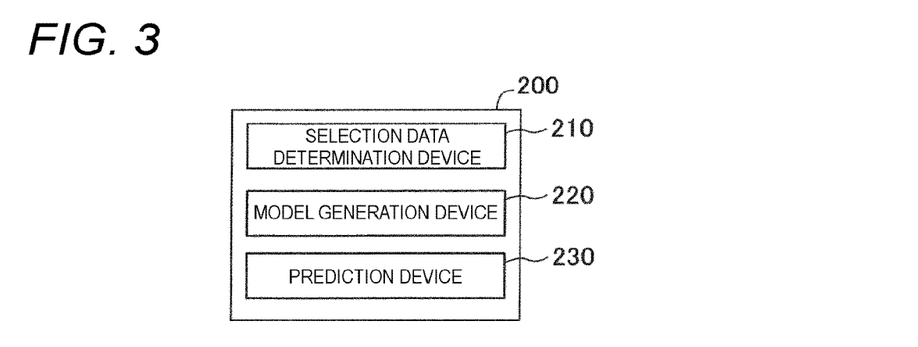
FIG. 3 is a diagram illustrating a configuration of a machine learning device.

Next, the configuration of the machine learning device 200 will be described with reference to FIG. 3. As illustrated in FIG. 3, the machine learning device 200 mainly includes a selection data determination device 210, a model generation device 220, and a prediction device 230.

The selection data determination device 210 determines the molding process data to be input to a learning model every time the prediction device 230 predicts a specified quality factor of a molded product based on the learning model. Specifically, the selection data determination device 210 determines an explanatory variable for explaining an objective variable that is a specified quality factor related to a molded product, from among explanatory variable candidates that are a plurality of pieces of molding process data that can be acquired from the molding machine 1.

The model generation device 220 performs machine learning in which the molding process data determined by the selection data determination device 210 and the quality factor data input to the input unit 110 is used as learning data, and generates a learning model that is related to the molding process data and the quality factor data. The prediction device 230 predicts a quality factor of a newly molded product, based on the molding process data determined by the selection data determination device 210 and the learning model generated by the model generation device 220.

(4-1. Selection Data Determination Device 210)

Figure 4:
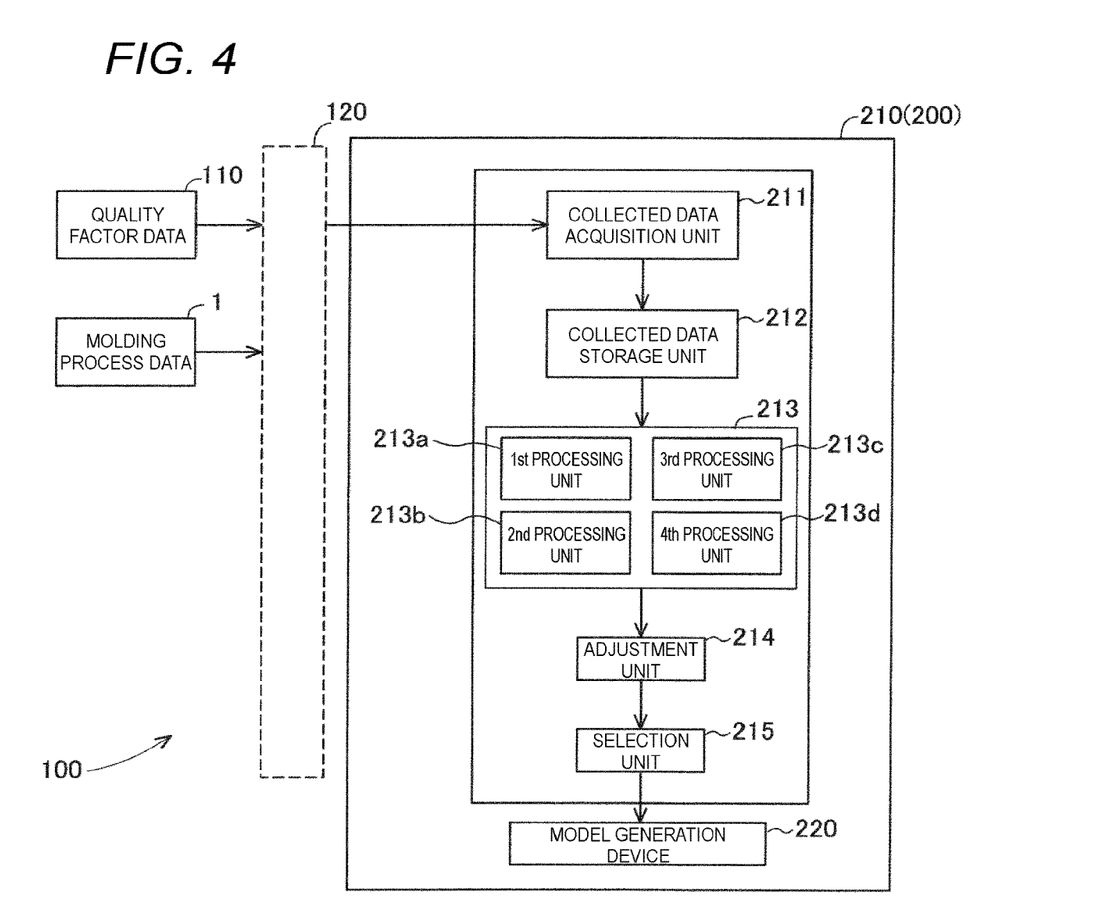
FIG. 4 is a diagram illustrating a configuration of a selection data determination device.

Subsequently, a configuration of the selection data determination device 210 will be described. As illustrated in FIG. 4, the selection data determination device 210 mainly includes a collected data acquisition unit 211, a collected data storage unit 212, a sparse modeling processing unit 213, an adjustment unit 214, and a selection unit 215.

The collected data acquisition unit 211 acquires the quality factor data and the molding process data collected by the server 120, and stores the acquired data in the collected data storage unit 212. In the quality prediction system 100, the server 120 collects measurement results input to the input unit 110, which is communicably provided, as quality factor data. Various types of sensors provided in the molding machine 1 are provided so as to be able to communicate with the server 120, and the server 120 collects detection results from the various types of sensors as molding process data.

The sparse modeling processing unit 213 uses a sparse modeling method to acquire, for each of a plurality of explanatory variable candidates, an individual importance degree serving as an explanatory variable for explaining an objective variable. The sparse modeling processing unit 213 includes a first processing unit 213a, a second processing unit 213b, a third processing unit 213c, and a fourth processing unit 213d. Each of the first processing unit 213a, the second processing unit 213b, the third processing unit 213c, and the fourth processing unit 213d acquires an individual importance degree for each of a plurality of explanatory variable candidates, using an objective variable and the plurality of explanatory variables as input data of a sparse modeling method. As used herein, the term "the first processing unit 213a, the second processing unit 213b, the third processing unit 213c, and the fourth processing unit 213d" may simply be referred to as "processing units," and the term "each of the first processing unit 213a, the second processing unit 213b, the third processing unit 213c, and the fourth processing unit 213d" may simply be referred to as "each processing unit."

Here, the individual importance degree is a value derived using a sparse modeling method, and indicates a strength of a relationship between a specified objective variable and each of a plurality of explanatory variable candidates. That is, an explanatory variable candidate having a high individual importance degree indicates a high relevance to a specified objective variable, and is suitable as an explanatory variable for explaining the objective variable.

In addition, each processing unit uses a different sparse modeling method. In the present embodiment, the first processing unit 213a uses Stepwise as the sparse modeling method, and the second processing unit 213b uses Lasso as the sparse modeling method. The third processing unit 213c uses Elastic Net as the sparse modeling method, and the fourth processing unit 213d uses the graphical Lasso as the sparse modeling method. Note that the sparse modeling processing unit 213 may use another sparse modeling method as a sparse modeling method used in each processing unit.

The adjustment unit 214 calculates an adjusted individual importance degree for the individual importance degree acquired by each processing unit of the sparse modeling processing unit 213. With respect to this adjusted individual importance degree, as described above, the sparse modeling method used by each processing unit differs. Therefore, for example, even if a contribution degree acquired by the first processing unit 213a and a contribution degree acquired by the second processing unit 213b have the same value, individual importance degrees in the first processing unit 213a and individual importance degrees in the second processing unit 213b may not be regarded as the same.

As a specific example of this point, it is assumed that a total value of contribution degrees acquired by the first processing unit 213a is 1 and a total value of contribution degrees acquired by the second processing unit 213b is 0.8. In this case, even if the value of contribution degree in the first processing unit 213a and the value of contribution degree in the second processing unit 213b are the same, it is considered that, as individual importance degrees, there is a difference therebetween since a ratio of the contribution degree to the total value of contribution degrees differs in each processing unit.

Therefore, the adjustment unit 214 calculates the adjusted individual importance degree, which is subjected to an adjustment that makes a scale for the individual importance degree equal, according to the contribution degrees derived by each processing unit of the sparse modeling processing unit 213. The adjustment method of the adjustment unit 214 will be described below with reference to a specific example.

The selection unit 215 calculates a comprehensive importance degree based on the adjusted individual importance degrees derived by the processing units of the sparse modeling processing unit 213, and selects an explanatory variable of the learning model, from among the explanatory variable candidates, based on the comprehensive importance degree. Here, the comprehensive importance degree is a value calculated based on at least one of a sum, a product, and an average of the adjusted individual importance degrees for each explanatory variable candidate. In the present embodiment, the selection unit 215 calculates a sum of the adjusted individual importance degrees and sets the calculated value as the comprehensive importance degree. Next, the selection unit 215 compares the comprehensive importance degrees of the plurality of explanatory variable candidates, determines that an explanatory variable candidate having a high comprehensive importance degree is an explanatory variable candidate suitable for the explanatory variable of the learning model, and selects the explanatory variable candidate having a high comprehensive importance degree.

In this way, the selection data determination device 210 performs processing of determining, from among a plurality of pieces of molding process data (explanatory variable candidates), a predetermined number of pieces of molding process data having a high relevance to a specified quality factor (objective variable) of the molded product as selection data (explanatory variable).

(4-2. Configuration of Model Generation Device 220)

Figure 5:
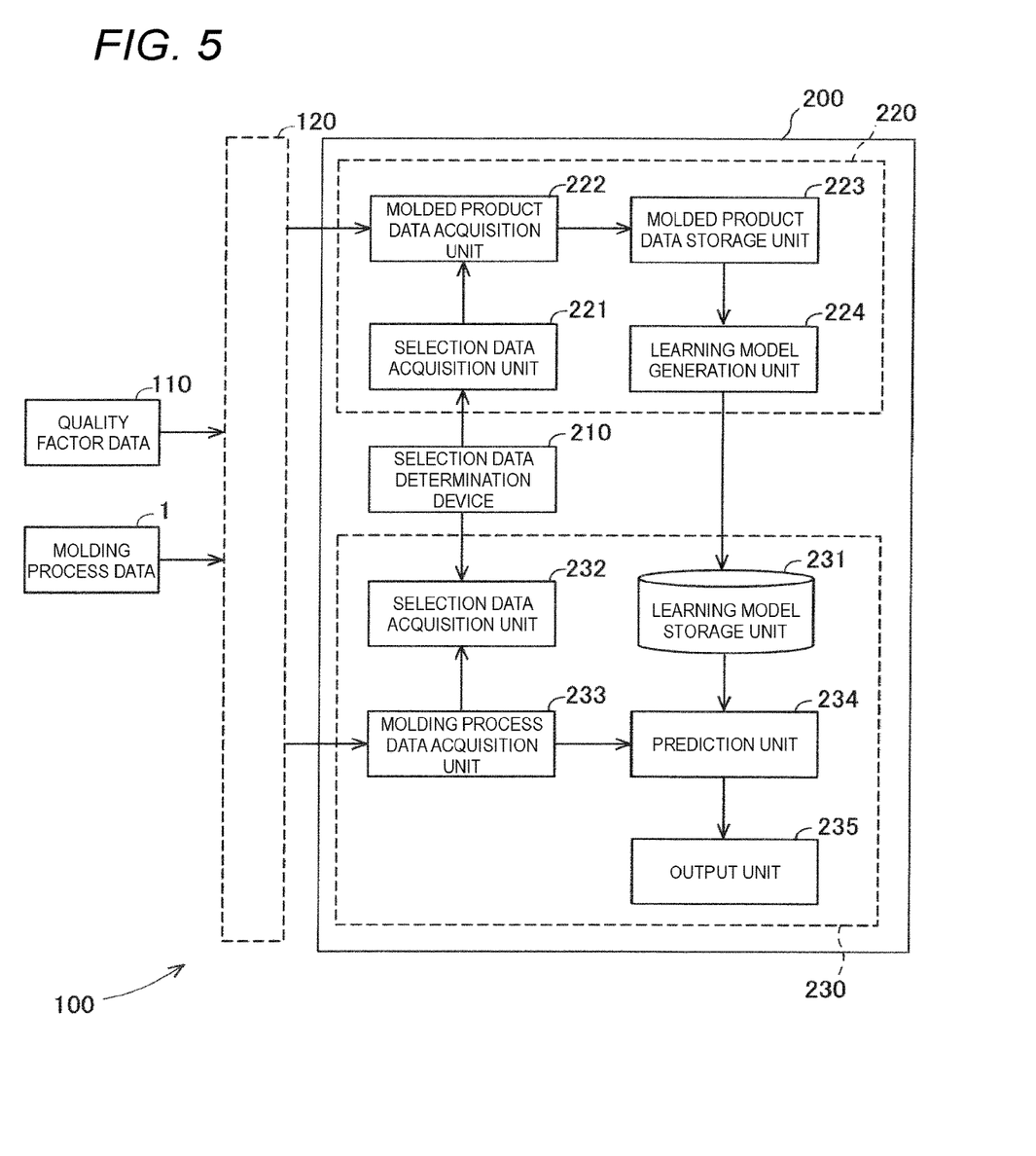
FIG. 5 is a diagram illustrating configurations of a model generation device and a prediction device.

Next, the configuration of the model generation device 220 will be described with reference to FIG. 5. The model generation device 220 includes a selection data acquisition unit 221, a molded product data acquisition unit 222, a molded product data storage unit 223, and a learning model generation unit 224.

The selection data acquisition unit 221 acquires information on the molding process data (explanatory variable) determined as the selection data by the selection data determination device 210. Based on information acquired from the selection data acquisition unit 221, the molded product data acquisition unit 222 extracts and acquires molding process data, which is selection data, from all molding process data acquired by the server 120. In addition, the molded product data acquisition unit 222 acquires quality factor data input to the input unit 110. Further, the molded product data storage unit 223 stores the molding process data and the quality factor data acquired by the molded product data acquisition unit 222.

The learning model generation unit 224 generates a learning model related to the molding process data and the quality factor of the molded product, by performing machine learning in which the molding process data and the quality factor data is used as learning data, based on the molding process data and the quality factor data stored in the molded product data storage unit 223. In this regard, the learning model generation unit 224 can efficiently generate the learning model because a large amount of the molding process data and the quality factor data collected by the server 120 is used as learning data of machine learning when generating the learning model.

The molded product data acquisition unit 222 may acquire all of the molding process data collected by the server 120. In this case, the molded product data storage unit 223 may store only the molding process data, which is the selection data, from among the molding process data acquired by the molded product data acquisition unit 222. Further in this case, the molded product data storage unit 223 may store all the molding data acquired by the molded product data acquisition unit 222, and the learning model generation unit 224 may extract only the molding process data, which is the selection data, from the molded product data storage unit 223.

(4-3. Configuration of Prediction Device 230)

Subsequently, the configuration of the prediction device 230 will be described with reference to FIG. 5. As illustrated in FIG. 5, the prediction device 230 mainly includes a learning model storage unit 231, a selection data acquisition unit 232, a molding process data acquisition unit 233, a prediction unit 234, and an output unit 235.

The learning model storage unit 231 stores a learning model generated by the learning model generation unit 224 of the model generation device 220. The selection data acquisition unit 232 acquires information on the molding process data (explanatory variable) determined as selection data by the selection data determination device 210. Based on information acquired from the selection data acquisition unit 232, the molding process data acquisition unit 233 acquires the molding process data, which is collected by the server 120 when a molded product is newly molded by the molding machine 1. Based on the molding process data acquired by the molding process data acquisition unit 233 and the learning model stored in the learning model storage unit 231, the prediction unit 234 predicts a quality factor of the newly molded product.

The output unit 235 outputs a prediction result from the prediction unit 234. The output unit 235 performs, for example, guidance by display on a display device (not illustrated), guidance by voice, or guidance by a display lamp. In this case, the output unit 235 may perform guidance on a display device or the like provided in the prediction device 230, on a display device or the like provided in each of a plurality of molding machines 1, or on a display device or the like provided in the server 120 or in the management device 130. The output unit 235 can also performs guidance on a portable terminal owned by a user or an administrator of the prediction device 230.

The prediction device 230 may include a determination unit, which determines whether a molded product that is newly molded is a qualified product, based on a prediction result of the quality factor from the prediction unit 234. In this case, the output unit 235 may output a determination result from the determination unit.

(5. Overview of Explanatory Variable Determination Procedure)

Next, an overview of an explanatory variable (selection data) determination procedure of the selection data determination device 210 will be described with reference to a flowchart illustrated in FIG. 6.

Figure 6:
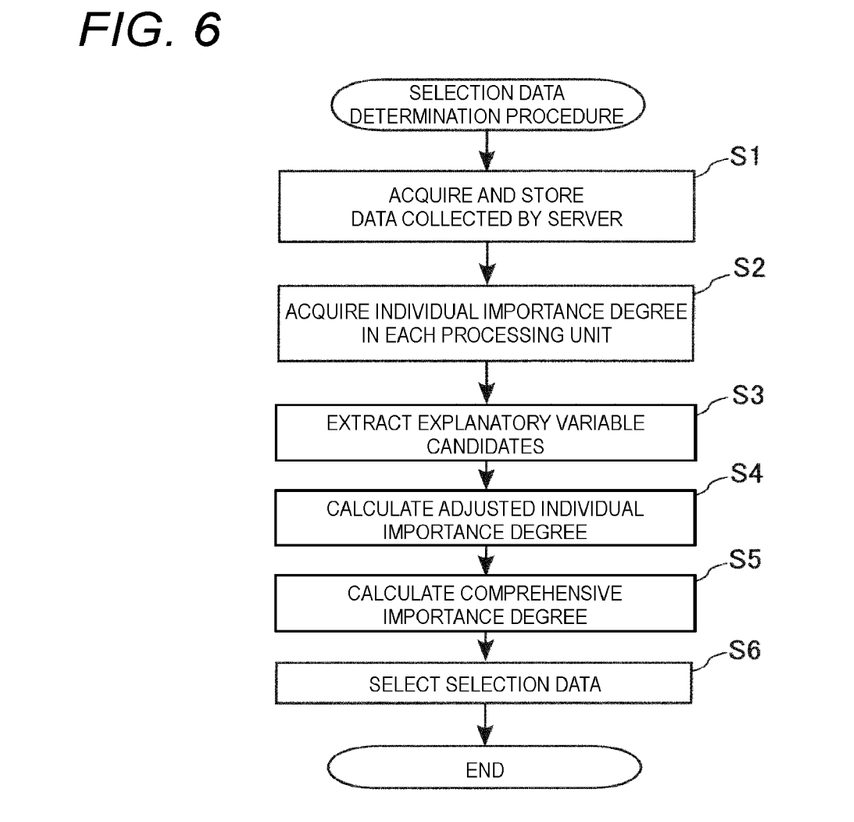
FIG. 6 is a flowchart illustrating a selection data determination procedure executed by the selection data determination device.

As illustrated in FIG. 6, as first processing in the selection data determination procedure, the selection data determination device 210 acquires and stores various types of data collected by the server 120 (S1). Specifically, in the processing of S1, the collected data acquisition unit 211 acquires molding process data serving as explanatory variable candidates collected by the server 120, and quality factor data serving as an objective variable, and stores the acquired molding process data and quality factor data in the collected data storage unit 212.

Following the processing of S1, the selection data determination device 210 acquires an individual importance degree in each processing unit of the sparse modeling processing unit 213 (S2: sparse modeling processing step). In the processing of S2, each processing unit acquires a contribution degree for each of a plurality of explanatory variable candidates, using the corresponding sparse modeling method which is different from those of the other processing units.

Following the processing of S2, the selection data determination device 210 extracts the explanatory variable candidates (S3: first adjusting step). In the processing of S3, the adjustment unit 214 extracts from each processing unit an explanatory variable candidate having a high individual importance degree. That is, in each processing unit, the adjustment unit 214 removes, from the molding process data serving as all the explanatory variable candidates collected from the server 120, molding process data having a low relevance to the quality factor of the molded product, which is the objective variable. Thereafter, the selection data determination device 210 calculates an adjusted individual importance degree (S4: second adjusting step). In the processing of S4, for the explanatory variable candidates extracted in the processing of S3, the adjustment unit 214 performs an adjustment according to the sparse modeling method in each processing unit, and calculates the adjusted individual importance degrees.

Following the processing of S4, the selection data determination device 210 calculates a comprehensive importance degree based on the adjusted individual importance degree (S5: first selecting step). In the processing of S5, the selection unit 215 calculates a comprehensive importance degree of each explanatory variable candidate, based on the individual importance degree acquired by each processing unit for each explanatory variable candidate. Thereafter, the selection data determination device 210 selects an explanatory variable of the learning model from among the plurality of explanatory variable candidates, based on the comprehensive importance degree calculated in the processing of S5 (S6: second selecting step). In the processing of S6, the selection unit 215 compares the comprehensive importance degrees of the plurality of explanatory variable candidates, and determines a predetermined number of pieces of molding process data, which serves as the explanatory variable candidate and has a high comprehensive importance degree, as selection data to be used as an explanatory variable of the learning model.

In this way, in the machine learning device 200, the selection data determination device 210 calculates the comprehensive importance degree for each of the plurality of explanatory variable candidates, based on the individual importance degrees obtained in the processing in which a plurality of sparse modeling methods different from each other are used. Further, the selection data determination device 210 selects a suitable explanatory variable candidate as the explanatory variable from among the plurality of explanatory variable candidates, based on the comprehensive importance degree. Therefore, the machine learning device 200 can reliably select, from among a plurality of explanatory variable candidates, a suitable explanatory variable candidate as an explanatory variable for explaining a specified objective variable.

(6. Specific Example of Explanatory Variable Determination Procedure)

Subsequently, a specific example of an explanatory variable determination procedure will be described with reference to examples. In the following example, the molding process data acquired from the molding machine 1 by the selection data determination device 210 as the explanatory variable candidates, includes a mold temperature, a cylinder temperature, a nozzle temperature, a back pressure, a maintaining pressure, a pressure-maintaining time, a cooling time, an injection speed, and a pressure-maintaining limit speed, V-P switching, and a screw rotation speed. The selection data determination device 210 can acquire molding process data other than the above as explanatory variable candidates.

(6-1. Adjusting Step and Selecting Step of First Example)

First, an adjusting step and a selecting step of a first example will be described with reference to FIGS. 7 and 8. As illustrated in FIG. 7, in the adjusting step of the first example, explanatory variable candidates having a contribution degree of 0.01 or greater are extracted in a first adjusting step. The adjustment unit 214 can set a reference value of the contribution degree at the time of extracting the explanatory variable candidates to a value larger than 0.01. Next, in the adjusting step of the first example, scores are assigned in descending order to the extracted explanatory variable candidates in descending order of contribution degree in a second adjusting step. That is, the adjustment unit 214 of the first example calculates, as adjusted individual importance degrees, scores that correspond to the individual importance degrees, and assigns the scores to the explanatory variable candidates.

For example, with respect to the first processing unit 213a, the adjustment unit 214 assigns a score of 10 to the "die temperature" that is an explanatory variable candidate having the highest contribution degree among the extracted explanatory variable candidates, and assign a score of 9 to the "maintaining pressure" that is an explanatory variable candidate having the second highest contribution degree. In the following, the adjustment unit 214 reduces the score to be assigned by one each time a ranking of the individual importance degree decreases by one. That is, the adjustment unit 214 of the first example assigns the score corresponding to the individual degree in an arithmetical series. In this way, the adjustment unit 214 can calculate the adjusted individual importance degree, which is adjusted such that a scale for the individual importance degree is equal, by assigning for each explanatory variable candidate a score corresponding to the contribution degree derived by each processing unit of the sparse modeling processing unit 213.

Figure 8:
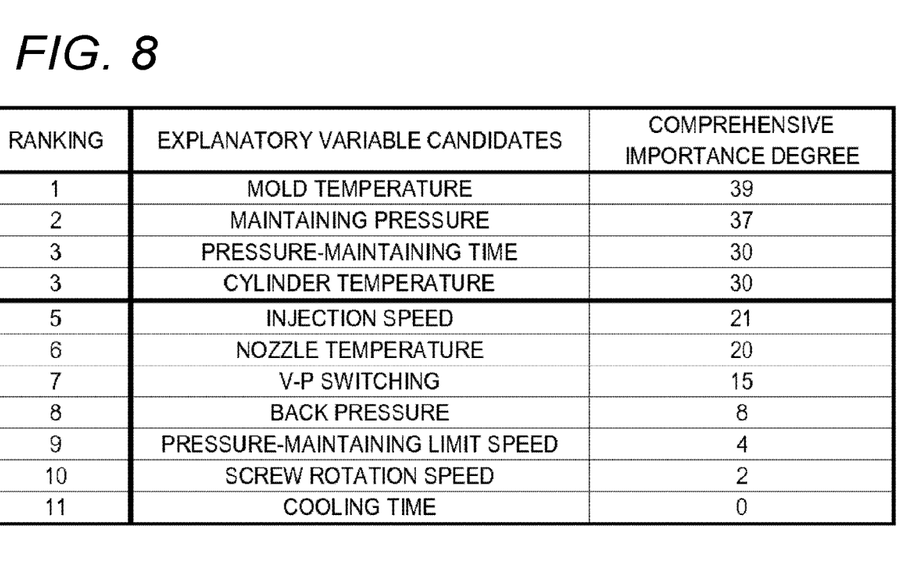
FIG. 8 is a table illustrating comprehensive importance degrees calculated by a selection unit in a selecting step of a first example.

Next, as illustrated in FIG. 8, in the first selecting step of the first example, comprehensive importance degrees are calculated in the first selecting step based on the scores calculated by the adjustment unit 214. That is, the selection unit 215 of the first example calculates, as the comprehensive importance degree, a sum of the scores (total score) assigned to each of the explanatory variable candidates. Subsequently, in the selecting step of the first example, an explanatory variable of a learning model is selected in a second selecting step based on the comprehensive importance degree (total score). In this example, in the second selecting step, the selection unit 215 selects explanatory variable candidates (mold temperature, maintaining pressure, pressure-maintaining time, and cylinder temperature) whose comprehensive importance degree is a score of 30 or greater.

In this way, the selection unit 215 of the first example selects, from among a plurality of explanatory variable candidates, an explanatory variable candidate having a comprehensive importance degree equal to or greater than a predetermined threshold (a score of 30 or greater in this example), as an explanatory variable of a learning model. Accordingly, the selection data determination device 210 can select, from among the plurality of explanatory variable candidates, a predetermined number of explanatory variables having a high relevance to an objective variable. Therefore, in optimizing operation conditions to improve a quality factor of a molded product, the user can narrow down operation conditions, which need to be adjusted to improve a specified quality factor of a molded product, from among a large number of operation conditions that can be adjusted. As a result, the user can shorten the time required for optimizing the operation conditions.

(6-2. Adjusting Step and Selecting Step of Second Example)

Next, an adjusting step and a selecting step of a second example will be described with reference to FIGS. 9 and 10. As illustrated in FIG. 9, in the adjusting step of the second example, five explanatory variable candidates having a high contribution degree are extracted in a first adjusting step. Note that, for example, when there are less than five explanatory variable candidates having a contribution degree equal to or greater than a predetermined threshold (for example, 0.01 or greater), the number of explanatory variable candidates to be extracted may be less than five.

Next, in the adjusting step of the second example, scores are assigned in descending order to the extracted explanatory variable candidates in descending order of contribution degree in a second adjusting step. That is, the adjustment unit 214 of the second example calculates, as adjusted individual importance degrees, scores that correspond to the individual importance degrees, and assigns the scores to the explanatory variable candidates.

For example, with respect to the first processing unit 213a, the adjustment unit 214 assigns a score of 10 to the "die temperature" that is an explanatory variable candidate having the highest contribution degree among the extracted explanatory variable candidates, and assign a score of 6 to the "maintaining pressure" that is an explanatory variable candidate having the second highest contribution degree. The adjustment unit 214 assigns a score of 4 to the "maintaining pressure" that is an explanatory variable candidate having the third highest contribution degree, a score of 2 to the "cylinder temperature" that is an explanatory variable candidate having the fourth highest contribution degree, and a score of 1 to the "injection temperature" that is an explanatory variable candidate having the fifth highest contribution degree. In this way, the adjustment unit 214 of the second example assigns the score corresponding to the individual importance degree in like a geometric series. The term "like a geometric series" means that, for example, a score difference between a first place and a second place is different from a score difference between the second place and a third place, or is different from a score difference between the third place and a fourth place. The score difference between the first place and the second place can be set to be smaller than the score difference between the second place and the third place or smaller than the score difference between the third place and the fourth place.

Figure 10:
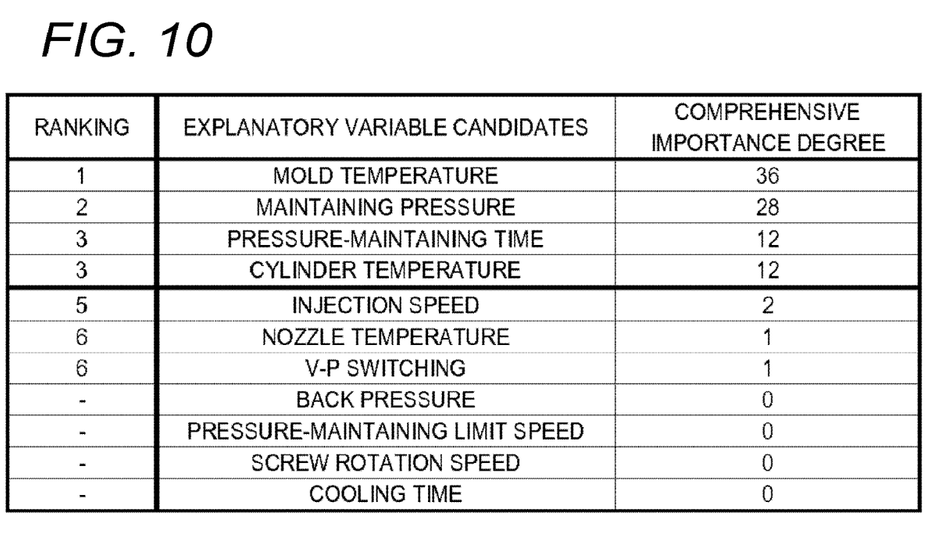
FIG. 10 is a table illustrating comprehensive importance degrees calculated by the selection unit in a selecting step of a second example.

Next, as illustrated in FIG. 10, in the selecting step of the second example, comprehensive importance degrees are calculated in a first selecting step based on the scores calculated by the adjustment unit 214. That is, the selection unit 215 of the second example calculates, as the comprehensive importance degree, a sum of the scores (total score) assigned to each of the explanatory variable candidates. Subsequently, in the selecting step of the first example, an explanatory variable of a learning model is selected in a second selecting step based on the comprehensive importance degree (total score). In this example, in the second selecting step, the selection unit 215 selects explanatory variable candidates (mold temperature, maintaining pressure, pressure-maintaining time, and cylinder temperature) whose comprehensive importance degree is a score of 10 or greater.

In this way, the selection unit 215 of the second example selects, from among a plurality of explanatory variable candidates, an explanatory variable candidate having a comprehensive importance degree equal to or greater than a predetermined threshold (a score of 10 or greater in this example), as an explanatory variable of a learning model. Accordingly, the selection data determination device 210 can select, from among the plurality of explanatory variable candidates, a predetermined number of explanatory variables having a high relevance to an objective variable.

(6-3. Adjusting Step and Selecting Step of Third Example)

Figure 11:
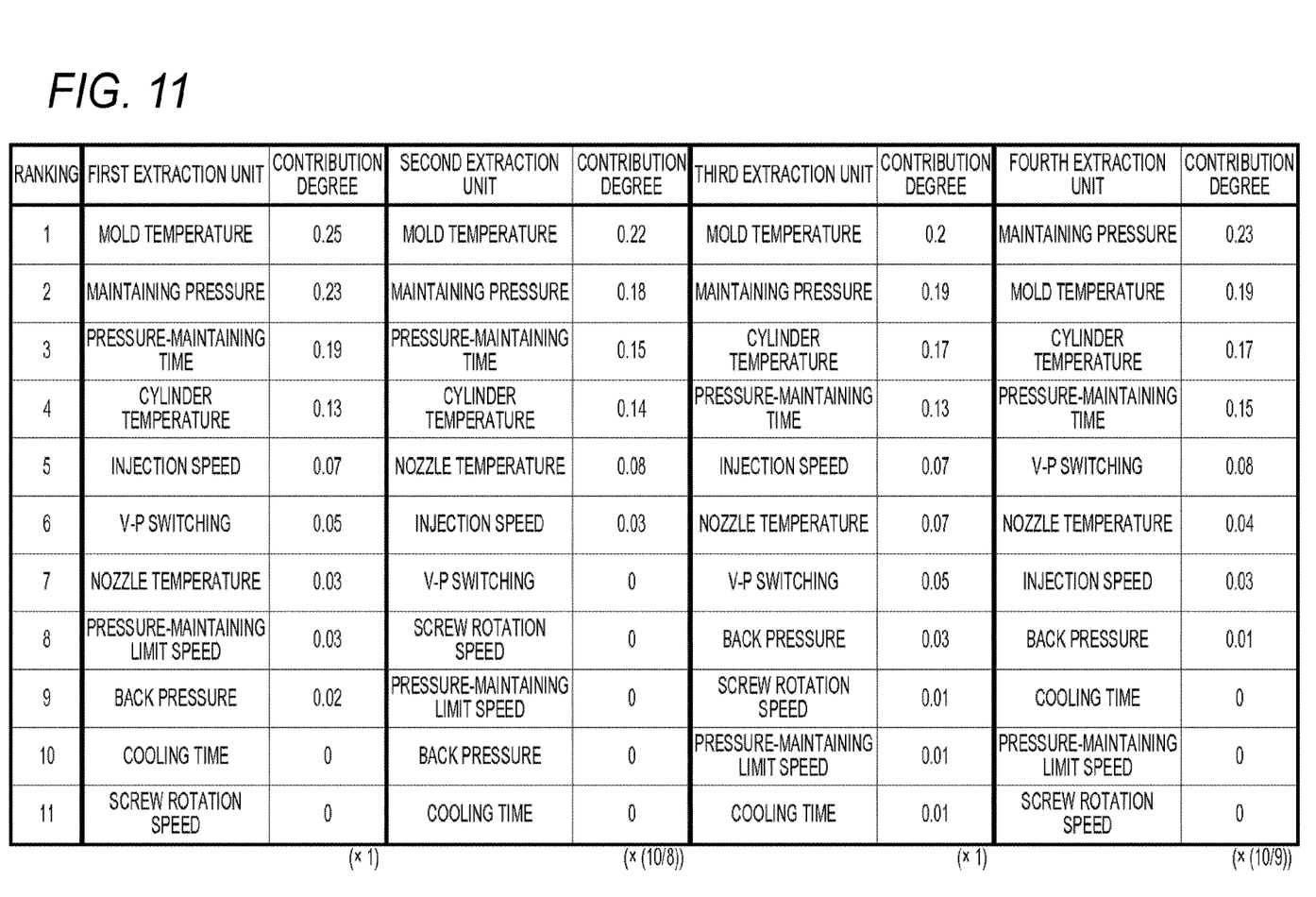
FIG. 11 is a table illustrating adjusted individual importance degrees calculated by the adjustment unit in an adjusting step of a third example.

Next, an adjusting step and a selecting step of a third example will be described with reference to FIGS. 11 and 12. As illustrated in FIG. 11, in the adjusting step of the third example, explanatory variable candidates having a contribution degree of 0.01 or greater are extracted in a first adjusting step.

Next, in the adjusting step of the third example, an adjustment according to the sparse modeling method of each processing unit is performed in a second adjusting step. Specifically, in the example illustrated in FIG. 11, sums of the individual importance degrees of the first processing unit 213a and the third processing unit 213c are both 1, while a sum of the individual importance degrees of the second processing unit 213b is 0.8, and a sum of the individual importance degrees of the fourth processing unit 213d is 0.9.

Therefore, the adjustment unit 214 of the third example calculates a value by multiplying the individual importance degree acquired by the second processing unit 213b by 10/8, and sets the calculated value as an adjusted individual importance degree in the second processing unit 213b. Similarly, the adjustment unit 214 of the third example calculates a value by multiplying the individual importance degree acquired by the fourth processing unit 213d by 10/9, and sets the calculated value as an adjusted individual importance degree in the fourth processing unit 213d. The adjustment unit 214 of the third example sets the individual importance degrees acquired by the first processing unit 213a and the third processing unit 213c as adjusted individual importance degrees.

Note that the adjustment method according to the sparse modeling method of each processing unit is not limited to the above. For example, the adjustment unit 214 may perform an adjustment such that an adjusted individual importance degree of an explanatory variable candidate having the highest contribution degree is "1" in value.

Figure 12:
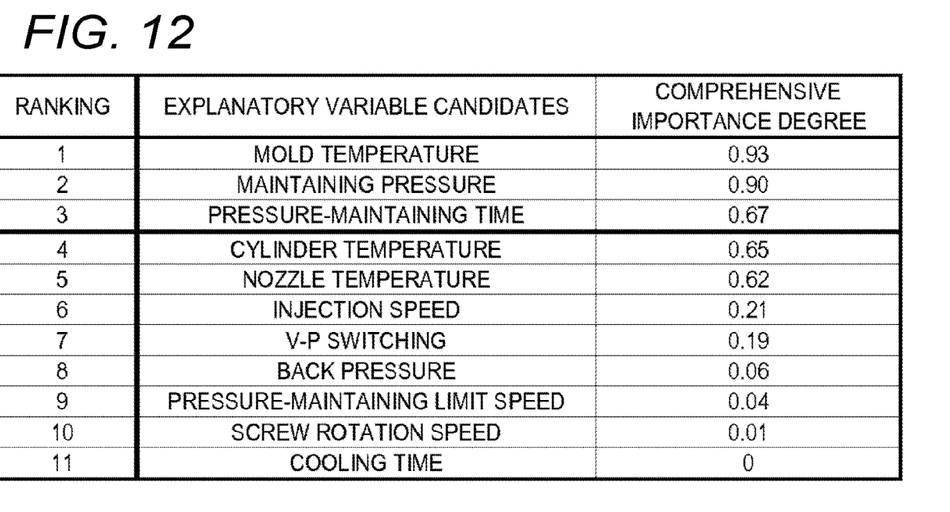
FIG. 12 is a table illustrating comprehensive importance degrees calculated by the selection unit in a selecting step of a third example.

Next, as illustrated in FIG. 12, in the selecting step of the third example, a sum of the adjusted individual importance degrees calculated for each explanatory variable candidate in each processing unit is calculated as a comprehensive importance degree in the first selecting step. Next, in the selecting step of the third example, an explanatory variable of a learning model is selected in a second selecting step based on the comprehensive importance degree (sum of individual importance degrees). In this example, in the second selecting step, the selection unit 215 selects three explanatory variable candidates (mold temperature, maintaining pressure, and pressure-maintaining time) in descending order of the comprehensive importance degree.

In this way, the selection unit 215 of the third example selects, from among a plurality of explanatory variable candidates, three explanatory variable candidates having a high comprehensive importance degree as explanatory variables of a learning model. Accordingly, the selection data determination device 210 can select, from among the plurality of explanatory variable candidates, a predetermined number of explanatory variables having a high relevance to an objective variable.

The invention claimed is:
1. A machine learning device, comprising:
    a sparse modeling processing unit that acquires a plurality of individual importance degrees for each of a plurality of explanatory variable candidates, the plurality of individual importance degrees being acquired by using respective sparse modeling methods different from each other, each of the sparse modeling methods taking input data comprising a specified objective variable in a learning model used for industrial activity and the plurality of explanatory variable candidates that are candidates for an explanatory variable for explaining the specified objective variable; and a selection unit that calculates a comprehensive importance degree for each of the plurality of explanatory variable candidates based on the plurality of individual importance degrees of each of the plurality of explanatory variable candidates, and selects an explanatory variable of the learning model from among the plurality of explanatory variable candidates based on the comprehensive importance degree.

2. The machine learning device according to claim 1, further comprising:

an adjustment unit that adjusts the plurality of individual importance degrees in accordance with the respective sparse modeling processing methods, and calculates a plurality of adjusted individual importance degrees, wherein the selection unit calculates the comprehensive importance degree based on the plurality of adjusted individual importance degrees.

3. The machine learning device according to claim 2, wherein each of the individual importance degree is a contribution degree which is a value derived by each of the sparse modeling methods and which indicates a strength of a relationship between the specified objective variable and each of the plurality of explanatory variable candidates, and wherein the adjustment unit extracts the explanatory variable candidate having the contribution degree equal to or greater than a predetermined threshold, and calculates the plurality of adjusted individual importance degrees for the extracted explanatory variable candidate.

4. The machine learning device according to claim 2, wherein the adjustment unit extracts a predetermined number of the explanatory variable candidates having high individual importance degrees, and calculates the plurality of adjusted individual importance degrees for each of the extracted explanatory variable candidates.

5. The machine learning device according to claim 2, wherein the adjustment unit calculates, as the adjusted individual importance degrees, scores corresponding to the plurality of individual importance degrees, and wherein the selection unit calculates the comprehensive importance degree based on the scores.

6. The machine learning device according to claim 5, wherein the adjustment unit calculates, as the adjusted individual importance degrees, the scores which are assigned in like an arithmetical series in accordance with the plurality of individual importance degrees.

7. The machine learning device according to claim 5, wherein the adjustment unit calculates, as the adjusted individual importance degrees, the scores which are assigned in like a geometric series in accordance with the plurality of individual importance degrees.

8. The machine learning device according to claim 1, wherein the selection unit calculates the comprehensive importance degree based on at least one of a sum, a product, and an average of the adjusted individual importance degrees for each of the plurality of explanatory variable candidates.

9. The machine learning device according to claim 1, wherein the selection unit selects, as the explanatory variable, the explanatory variable candidate having the comprehensive importance degree equal to or greater than a predetermined threshold.

10. The machine learning device according to claim 1, wherein the selection unit selects, as the explanatory variable, a predetermined number of explanatory variable candidates having high comprehensive importance degrees.

11. The machine learning device according to claim 1, further comprising:

a learning model generation unit that generates the learning model by machine learning in which the explanatory variable candidate selected by the selection unit is used as learning data.

12. The machine learning device according to claim 1, further comprising:

a learning model storage unit that stores the learning model generated by machine learning in which the explanatory variable selected by the selection unit is used as learning data; and a prediction unit that performs a predetermined prediction, based on the explanatory variable and the learning model.

13. The machine learning device according to claim 12, wherein the machine learning device is provided in a processing device that performs predetermined processing, or in a management device that performs overall management of a plurality of the processing devices, and wherein the prediction unit predicts abnormality detection of the processing device, optimization of operation conditions of the processing device, or a processing result of the processing device.

14. The machine learning device according to claim 13, wherein the processing device comprises:

an operation command unit that sends operation command data to a control unit; and an operation command data adjustment unit that adjusts the operation command data based on a prediction result of the prediction unit.

15. The machine learning device according to claim 13, the processing device is a molding machine, and the prediction unit predicts a quality factor of a molded product to be produced by the molding machine.

16. A machine learning method, comprising:

acquiring a plurality of individual importance degrees for each of a plurality of explanatory variable candidates, the plurality of individual importance degrees being acquired by using respective sparse modeling methods different from each other, each of the sparse modeling methods taking input data comprising a specified objective variable in a learning model used for industrial activity and the plurality of explanatory variable candidates that are candidates for an explanatory variable for explaining the specified objective variable; and calculating a comprehensive importance degree for each of the plurality of explanatory variable candidates based on the plurality of the individual importance degrees of each of the plurality of explanatory variable candidates, and selecting an explanatory variable of the learning model from among the plurality of explanatory variable candidates based on the comprehensive importance degree.

17. The machine learning method according to claim 16, further comprising:

adjusting the plurality of individual importance degrees in accordance with the respective sparse modeling methods, and calculating a plurality of adjusted individual importance degrees; and calculating the comprehensive importance degree based on the plurality of adjusted individual importance degrees.

* * * * *